3,036,997
DIENE-MODIFIED POLYMERS AND ELASTOMERS THEREFROM
John B. Campbell, Hockessin, Del., assignor to E. I. du Pont de Nemours and Company, Wilmington, Del., a corporation of Delaware
No Drawing. Filed Nov. 21, 1956, Ser. No. 623,521
9 Claims. (Cl. 260—77.5)

This invention is directed to certain novel and inherently elastomeric polymers containing two or more 1,3-diene units, and polymers being capable of being chain-extended or simultaneously extended and cross-linked to form elastomers.

It is an object of the present invention to prepare novel diene-modified polymers, and elastomers therefrom via the Diels-Alder reaction. The present invention employs diene-modified inherently elastomeric polymers as the polyfunctional diene in reaction with difunctional dienophiles.

More specifically, it is an object of the present invention to provide essentially linear diene-modified organic polymers having molecular weights of at least 1,000 and which are convertible to elastomers by the Diels-Alder reaction with bis-dienophiles, said polymers being composed of inherently elastomeric divalent linear polymeric segments which are linked through ether, amine, amide, ester, urethane or urea groups to nonpolymeric organic radicals containing a 1,3-dienic hydrocarbon unit capable of undergoing the Diels-Alder reaction, said polymeric segments having a molecular weight of at least about 700 to about 12,000 and being either long chain hydrocarbon radicals, long chain chlorohydrocarbon radicals, polyether segments of polyether glycols or polyurethane segments of said polyether glycols, there being at least one polymeric segment and at least two of said dienic hydrocarbon units in the molecule, at least an average of one of said dienic units per 12,000 molecular weight of polymer and not more than an average of one of said dienic radicals per 500 molecular weight of polymer.

The polymers of this invention are diene-modified inherently elastomeric polymers which are capable of being extended, or extended and cross-linked simultaneously or just cross-linked, depending on the multiplicity of 1,3-diene units present, on reaction with bis-dienophiles such as the bis-maleimides. The reaction involved is the classical Diels-Alder condensation of a 1,3-diene system with an ethylenic link, and may be represented schematically as follows:

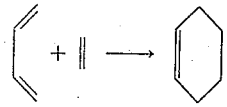

According to the method of the present invention, the 1,3-dienic units are incorporated into polymers which are inherently elastomeric by reaction of difunctional polymers with mono- and di-functional 1,3-dienic compounds. Inherently elastomeric polymers that may be modified conveniently to contain 1,3-diene units that are reactive towards a typical dienophile such as maleic anhydride, are long chain bifunctional compounds in which the functional groups are separated by a long chain having a molecular weight in the range from about 700 to 15,000. Representative polymers of this type are: the polyhydrocarbons and polychlorohydrocarbons terminated on each end with hydroxy, amino or carboxylic acid functions; polyetherglycols and the corresponding bis-chloroformates; and polyether-polyurethanes terminated by isocyanate or amino groups. These may be represented by the formula X—B—X where X=X=hydroxyl, primary and secondary amino, chlorocarbonyl, isocyanato, and the like, and where B is an elastomeric organic polymer segment of the type indicated.

Modification of the starting polymer X—B—X by the methods used in this invention involves reacting X—B—X with a compound D—Y or Y—D—Y, D being a radical containing a 1,3-diene unit and Y being a reactive group, such as hydroxyl, thiol, primary and secondary amino, carboxyl, chlorocarbonyl, chlorosulfonyl, isocyanato, haloalkyl, and the like, which is capable of reacting with X to produce a linking group, L, such as ether, amine, amide, urethane, urea and ester groups. In the preparation of the diene-modified polymers, groups X and Y will be selected on the basis of their ability to produce group L which serves to link D to B.

The polymers of this invention may be represented by the following schematic formulas:

I.     D—LBL—D
II.    (DLBL)$_n$DLBL—
III.   Y—(DLBL)$_n$—DLBL—DY
IV.   X—BL—(DLBL)$_n$—DLB—X
V.    F—L—(DLBL)$_n$—DLBL—DL—F
VI.   FLBL—(DLBL)$_n$—DLBL—F

D, B, X, Y and L are as previously indicated; F stands for D or R, R being a non-dienic organic radical; $n$ is an integer including zero, provided there are at least 2 D radicals in the molecule.

Polymers III–VI differ from II in the nature of the terminal groups, all having the polymeric segment (DLBL)$_n$.

Polymer I, e.g., D—NHCONH—B—NHCONH—D, is obtained on reacting two moles of D—Y, e.g., D—NCO, with one mole of X—B—X, e.g., $$NH_2-B-NH_2$$

Reaction of substantially equal moles of Y—D—Y and X—B—X will produce as an average structure

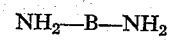

which is equivalent to (DLBL)$_n$ designated as Polymer II. Polymers III and IV are variations of II and are obtained when either of the reactants, as the case may be, is used in excess. It will be apparent that if III is reacted with IV the product will be II. Polymers V and VI may be obtained from III and IV on further reaction of these polymers with monofunctional reagents. For example, if III contains terminal isocyanate groups (Y=NCO) it may be reacted with a monofunctional reagent such as a dienic amine or alcohol, i.e., D—Y, Y=NH$_2$ or OH, e.g., 2-aminoanthracene or sorbyl alcohol, or with a non-dienic amine, etc., i.e., R—Y, e.g., piperidine, to produce a type V polymer. Similarly if the terminal groups X on IV are NH$_2$ groups it may be reacted with a dienic or non-dienic monoisocyanate, carboxylic acid chloride, sulfonyl chloride or the like to produce a type VI polymer. When F=D in VI then the polymer is DLBL—(DLBL)$_n$—DLBL—D. In short then, Polymers I and VI where F=D have the formula DLBL—(DLBL)$_p$D where $p$ is an integer including zero.

All the polymers are characterized in having a dienic radical linked to a polymeric segment which is linked to another dienic radical. The dienic radical may be terminally linked to the polymer chain, appended to the chain, or contained as a segment within the polymer chain.

Further it should be noted that polymers of the type III and IV are capable of being extended on reaction with difunctional extending agents; that is, polymers III and IV are themselves of the formula X—B*—X, where B* is a polymeric segment containing within the polymeric segment one or more dienic groups. The extending agents for polymers X—B*—X may be either difunctional dienic compounds (Y—D—Y) or non-dienic (Y—R—Y) or mixtures of these two types. When mixtures of Y—D—Y and Y—R—Y are employed it is convenient, for the purpose of representing the structures schematically, to consider the mixture as Y—D*—Y. The use of the mixture Y—D*—Y (having a diluted concentration of dienic groups) affords a means of controlling the relative concentrations of dienic radicals along the polymer chain in a series of otherwise substantially identical polymers.

Therefore it is within the scope of this invention to prepare diene-modified inherently elastomeric polymers of the type designated as I to VI wherein the polymeric segment —B— may also be —B*—, and D— and/or —D— may be D*— and/or —D*—, the above radicals bearing the asterisk representing mixtures of dienic and non-dienic radicals, which will be described more fully in this specification, with the proviso that there be at least two radicals in the molecule containing a 1,3-diene unit. Furthermore, there will be an average of at least one such dienic group per 12,000 molecular weight of polymer and not more than an average of one such dienic group per 500 molecular weight of polymer. These limitations are imposed on all the diene-modified polymers of this invention so that the resulting polymers obtained on reaction with bis-dienophiles will have desirable elastic properties.

The new elastic polymers obtained by means of the Diels-Alder reaction of a bis-dienophile such as a bis-maleimide with the diene-modified polymers outlined above are also within the scope of this invention. These are of two types: (1) Thermoplastic elastomers, which are essentially linearly extended uncross-linked polymers, obtained from a diene-modified polymer having two 1,3-diene units in the molecule; (2) extended and cross-linked elastomers obtained from diene-modified polymers having more than two 1,3-diene units in the molecule.

Compounds D—Y and Y—D—Y stand for a large variety of aliphatic, aromatic and mixed aliphatic-aromatic compounds which contain a Diels-Alder reactive 1,3-butadiene unit and which are capable of condensing through —Y with X— of X—B—X, as defined. Particularly suitable are the "1,3-dienic" mono- and di-ols, mono- and di-amines, mono- and di-carboxylic acids and their derivatives, the mono- and di-sulfonic acids and derivatives, and the mono- and di-isocyanates. The preferred D—Y and Y—D—Y reactants are those containing the diene unit in the form of an anthracene unit and in which Y is preferably a primary or secondary amino group, an isocyanato group, or a chloroformyl group.

Radical D is a monovalent or divalent organic radical containing a 1,3-diene unit,

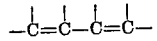

capable of undergoing the Diels-Alder reaction with dienophiles such as maleic anhydride, acrylic esters, alpha, beta-unsaturated sulfones, and the like. The 1,3-diene unit may be acyclic, mixed acyclic-cyclic or dicyclic: thus the 1,3-diene unit may be present in D as found in 1,4-disubstituted butadienes (i.e., —CH=CH—CH=CH—) and in 2,3-disubstituted butadienes

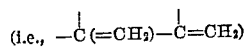

including open-chain compounds such as sorbic acid and cyclic compounds such as the 1,3-dimethylene-cyclohexane derivatives; or in the cyclic type typified by anthracene compounds; or in the acyclic-cyclic type as represented by the 2-vinylcyclohexene derivatives; or in the dicyclic type as represented by the 1,1'-di-cyclohexene derivatives. The 1,3-diene unit may be cis or trans, the only requirement being that the two ethylenic groups are not sterically prevented from assuming the cis-position. Thus the term "capable of undergoing the Diels-Alder reaction" is meant to exclude sterically hindered 1,3-dienes such as the acyclic 2,3-di-t-butyl-1,3-dienes which do not form adducts with typical dienophiles such as maleic anhydride and its imides. In the preferred embodiment of this invention the 1,3-butadiene unit is fixed in the cis-configuration by being contained in a cyclic hydrocarbon radical, more particularly, as in anthracene.

Dienic carboxylic acids and anthracene are readily available, valuable starting materials for the preparation of D—Y and Y—D—Y.

Dienic acids such as sorbic acid, muconic acid, eleostearic acid (from China-wood oil), licanic acid (from oiticica oil) and octadeca-9,11-dienic acid (the dehydration product of ricinoleic acid) are representative dienic acids which may be used as such, or as the acid chlorides ($Y=CO_2H$, $COCl$) or which may be reduced by $LiAlH_4$ to the corresponding dienic alcohols ($Y=OH$). Similarly spilanthol, a naturally-occurring N-isobutylamide of deca-4,6-dienic acid, may be hydrolyzed to the acid or reduced by $LiAlH_4$ to the dienic secondary amine ($Y=NH$-alkyl). The dienic acid, e.g., octadeca-9,11-dienic acid, may be converted by known chemical transformations to the isocyanate ($Y=NCO$), e.g., by thermal rearrangement of the carbonyl-azide which is obtained via the acid chloride and sodium azide. Compounds Y—D—Y in which a monovalent diene-containing radical is attached to a radical containing both Y groups are represented by the N,N-bis(beta-hydroxyethyl) amides of the dienic monocarboxylic acids. When molecules of this type are used to extend polymers X—B—X the dienic groups are present in the extended polymers as appendages on the main polymer chain.

In one class of anthracene compounds, the groups Y, such as $NH_2$, $NCO$, $CO_2H$, $COCl$, $SO_2OH$, $SO_2Cl$, are attached directly to a ring carbon atoms, preferably in one or both of the outer rings. Representative D—Y and Y—D—Y compounds are: the 1-amino-, 2-amino-, and 2,6-diamino-anthracenes; anthracene 2-carbonyl chloride and 2,6-dicarbonyl chloride; anthracene 2,6-disulfonyl-chloride.

In another class of anthracene compounds the group Y is attached to the aromatic nucleus via a linking aliphatic group, e.g., alkylene, alkyleneether. Because they are most economically and easily prepared, the 9- and 9,10-di-substituted members of this class are preferred. Typical Y-bearing aliphatic groups are chloro-alkyl, hydroxyalkyl, aminoalkyl, hydroxyether, and the like. Representative compounds are 9,10-bis(chloromethyl)-, 9,10-bis(hydroxymethyl)-, 9,10-bis - (aminomethyl)-, 9,10-bis(methylaminomethyl)-, 9,10-bis(beta - hydroxyethyl)bis(methylaminomethyl)-, and 9,10-bis(—$CH_2O$—$(CH_2)_4$—OH)-anthracene. The hydroxy-terminated groups may be employed as the chloroformates, and the aliphatic secondary amino compounds as the carbamyl chlorides.

In one embodiment of the invention, Y—D—Y, when D is contained in a polymeric segment, may be employed as X—B*—X. For example, reaction of an excess of polytetramethyleneether glycol with 9,10-bis(chloromethyl)anthracene in presence of KOH (Williamson ether synthesis) produces a new polyether glycol containing 1,3-diene units in the form of the anthrylene radical. The polyether glycols (HO—B—OH and HO—B*—OH) are discussed below.

Both Y groups may be attached via the same aliphatic group to the anthracene nucleus, as in

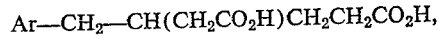

where Ar is the 2-anthryl radical. By the usual transformations the —$CO_2H$ groups may be converted as desired into —$CH_2OH$, —$CH_2NH_2$, etc. Also suitable is Ar—$(CH_2)_3$—CO—$N(CH_2CH_2OH)_2$, obtainable from the corresponding carboxylic acid.

In the preparation of the diene-modified polymers of this invention, the starting polymers designated as X—B—X above may be, as stated earlier, long chain hydrocarbons and chlorohydrocarbons which are terminally substituted by functional groups capable of undergoing the usual condensation reactions. Thus X—B—X may be a long chain hydrocarbon or chlorohydrocarbon, terminal X being OH, NH₂, NCO, —OCOCl, —COCl, and the like. They are most conveniently prepared by polymerizing the appropriately ethylenically unsaturated monomers in the presence of certain free radicals, as more fully described below, which yield hydrocarbon chains having terminal groups readily converted to the desired groups by known chemical transformations. The unsaturated polymers which result from the polymerization may be hydrogenated by conventional methods to produce essentially saturated polymeric difunctionally substituted compounds which may be used to prepare the novel compositions of this invention. The most suitable ethylenically unsaturated monomers which may be polymerized are conjugated dienes, such as butadiene, isoprene, chloroprene(2-chlorobutadiene), and the like. Mixtures of these conjugated dienes with minor amounts of other polymerizable ethylenically unsaturated compounds may be used. For example, styrene or isobutylene may be copolymerized with the dienes to form the long chain carbon skeletons. In these polymeric products the main chain (i.e., the polymer backbone) will contain side chains to a greater or lesser extent. Side chains occur when radicals are attached to the ethylenic system which takes part in the chain formation. Thus phenyl and methyl side chains in the polymer result from the phenyl or the styrene and the methyl of the isoprene, respectively. Similarly, vinyl and other unsaturated side chains result to some extent from butadiene and other conjugated dienes reacting by 1,2-addition. The principal mode of addition of the dienes is 1,4, however, yielding polymers which contain basic units such as

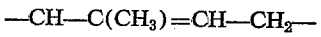

(from isoprene), —CH—C(Cl)=CH—CH₂— (from 2-chlorobutadiene-1,3), and the like.

A convenient source of free radicals for making the above bifunctional compounds by polymerization are the aliphatic azo dinitriles and azo dicarboxylic esters in which the carbon atoms attached to the azo group are tertiary, having the general formulas:

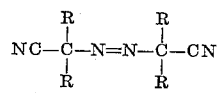

and

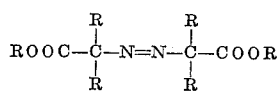

These compounds yield nitrogen and free radicals corresponding to the groups originally attached to the azo groups. On heating the ethylenically unsaturated monomers with the azo compounds, the free radicals generated take part in the polymerization, the result being a polymer chain terminated at each end by the free radical. Thus butadiene with alpha,alpha'-azodiisobutyronitrile or with ethyl alpha,alpha'-azodiisobutyrate respectively produces

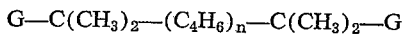

where G is CN and CO₂C₂H₅, respectively. Desired molecular weights are in the range 750 to 12,000. These may be obtained by a proper choice of the ratio of monomer to azo compound, the higher ratios giving the longer chains.

The dinitrile produced above may be catalytically hydrogenated to the corresponding saturated diamine, or it may be reduced with lithium aluminum hydride, LiAlH₄ (which affects only the nitrile groups), to the unsaturated diamine. When the dicarboxylate is reacted with LiAlH₄ the product is the unsaturated glycol; this may be catalytically hydrogenated to the saturated glycol. The unsaturated glycols may also be prepared by using free hydroxyl radicals, e.g., from hydrogen peroxide, in emulsion polymerization of dienes such as chloroprene. If desired, the dicarbethoxy terminated polymers, prepared as described above, may be converted by known methods into the corresponding dicarbonylchlorides and the dicarbonylazides, the latter, by Curtius rearrangement with loss of nitrogen gas, affording the corresponding diisocyanates.

Difunctional compounds containing long hydrocarbon chains may also be made by the conventional synthetic methods, such as converting a long chain dicarboxylic acid to the corresponding omega bromo monocarboxylic acid, converting this to the dicarboxylic acid with double the number of carbon atoms by eliminating bromine, repeating the series of operations, and finally obtaining a long chain dicarboxylic acid. This polymeric dicarboxylic acid may be used as such or as its diacid chloride, or converted to the corresponding diisocyanate or diamine or diol by known methods. Such methods for building up compounds of high molecular weight are laborious but have the advantage of yielding products which are chemical individuals, of precise molecular weight and definite side chain structure or entirely free from side chains. On the other hand, the mixtures produced by polymerization, are usually cheaper and more readily available and are therefore preferred. The preferred difunctional long chain polymers of molecular weight at least 750 which are obtainable by the above methods are the diamines, particularly the diamino-polyisoprenes. As described above, these diamines may be modified to contain 1,3-diene units for subsequent reaction with bis-dienophiles by reaction with a molecule that contains the 1,3-diene unit and in addition one or two functional groups such as —NCO, —OCOCl, —COCl.

To illustrate: A linear polyisoprene terminated on each end with NH₂ groups and having a molecular weight in the range 750–12,000 is reacted with two moles of a dienic isocyanate such as 2-anthracene isocyanate, preferably in solvent such as tetrahydrofuran, to obtain a polyisoprene terminated on each end with 1,3-dienic groups which are linked to the polymer chain by urea groups. This capped polyisoprene is then infinitely extended to a thermoplastic elastomer by reacting it with a bis-dienophile such as the alkylene or arylene bis-maleimides. The extension step may be effected in solution, e.g., in dimethylformamide, or in the usual way of compounding the diene-modified polyhydrocarbon elastomer on a rubber mill with the bis-dienophilic extending agent, placing the compounded stock in a rubber mold which is then closed and heated under pressure to effect the condensation (i.e., increase in molecular weight). The Diels-Alder condensation of the diene-modified polymers with bis-dienophiles is generally done at temperatures of from 100 to 150° C., normally at about 140° C. for about 1 hour.

The amino-terminated polyisoprene may be infinitely extended first on reaction with a dienic diisocyanate, e.g., 2,6-anthracene-diisocyanate. If an excess of diisocyanate is employed the resulting polymer will contain urea links and terminal NCO groups; if desired, this polymer may be capped by reacting it with a monoamine such as piperidine or 2-aminoanthracene. Press-curing of the diene-modified polymers with a bis-dienophile such as n-phenylene-dimaleimide at 140° C. for 1 hour yields a cross-linked elastomer.

In a modification of the above method the diamino polyisoprene is chain-extended with a mixture of organic diisocyanates one of which is a dienic diisocyanate, i.e., Y—R—Y and Y—D—Y. The molecular weight of the diamino polyisoprene and the mol ratios of the mixture of diisocyanates controls the number of and the relative spacing of dienic groups introduced into the polymer chain.

X—B—X may be a polyether glycol or its corresponding bis-chloroformate having a molecular weight in the range of 750–12,000. By polyether glycols is meant polyalkyleneether glycols, polyalkyleneether-thioether glycols, polyalkyleneether-aryleneether glycols, and polyalkyleneether-aryleneether-thioether glycols.

For the polyalkyleneether glycols, $$X—B—X = HO—(RO)_nH$$

where R is an alkylene radical and $n$ is an integer sufficiently large that the polyalkyleneether glycol has a molecular weight in the stated range. The analogous glycols containing thioether groups are similar except that some of the ether oxygens are replaced by sulfide (—S—) groups. The glycols containing arylene groups are similar to the above except that some of the alkylene groups are replaced by such arylene groups as phenylene, naphthylene, anthrylene radicals and the like. In still another embodiment the carbocyclic radical may be saturated such as 1,4-cyclohexylene.

The polyalkyleneether glycols are ordinarily derived from the polymerization of cyclic ethers such as alkylene oxides or dioxolane or from the condensation of glycols. They are sometimes known as polyalkylene glycols, polyalkylene oxide glycols, polyglycols or polyoxyalkylene diols. In the present invention, polytetramethyleneether glycol is preferred. Other glycols which may be used are polyethyleneether glycol, polypropyleneether glycol, poly-1,2-butyleneether glycol, and polydecamethyleneether glycol, i.e., the alkylene radicals contain from 2 to about 10 carbon atoms.

The polyalkyleneether-thioether glycols which may be used are obtainable by known methods. Typical polyalkyleneether-thioether glycols are:

$HO(C_2H_4SC_2H_4OC_2H_4O)_nH$,
$HO(C_2H_4SC_2H_4O)_nH$,
$HO(C_2H_4SC_2H_4OC_2H_4OC_2H_4O)_nH$,
$HO(C_2H_4SC_2H_4OC_3H_6O)_nH$,
$HO(C_2H_4SC_4H_8SC_2H_4O)_nH$,
$HO(C_2H_4SC_2H_4OC_{10}H_{20}O)_nH$, where $n$ has the significance given above.

In the polyalkyleneether-aryleneether glycols the majority of the hydrocarbon radicals will be alkylene radicals having up to about 10 carbon atoms. A preferred class of polyalkylene-aryleneether glycols useful in this invention are those having the formula $$HO—(C_4H_8O)_m—A—O(C_4H_8O)_p—H$$

in which $m$ and $p$ are integers large enough to give each of the radicals within the parentheses formula weights between 500 and 1000 and A is phenylene, naphthylene, cyclohexylene, xylylene, or (particularly)

$$—CH_2—A—CH_2—$$

where A stands for 9,10-anthrylene. Where anthrylene radicals are present, the molecule may be represented as $HO—(R^*—O)_n—H$ where one or more of the R groups will contain a 1,3-diene unit, the remaining R groups being non-dienic.

The bis-chloroformates of these polyether glycols are represented by the formula Cl—OCO—R—OCO—Cl, in which R is a bivalent organic radical having a formula weight of at least 716. They are prepared by reaction of the above polyether glycols with phosgene. Bis-chloroformates useful for the present purpose have average molecular weights which are at least 875 and may be as high as about 12,000, with 875 to 3500 being preferred. The polyalkyleneether bis-chloroformates are preferred, particularly polytetramethyleneether bis-chloroformate and its mixtures with bis-chloroformates of polytetramethyleneether glycol which has been modified to contain anthracene radicals in the polyether chain.

Using the methods described in illustrating the preparation of the present novel elastomers from the diaminopolyhydrocarbons, the dihydroxy polyethers, i.e., the polyether glycols described above, may be capped or extended in reaction with dienic molecules D—Y or Y—D—Y. In modifying the polyether glycols themselves, it is preferred to employ the dienic isocyanates to form urethane links between D and B. The polyethers capped in this way by 1,3-diene-containing units, and containing no other 1,3-diene unit in the polymer chain, may be "infinitely extended" by bis-dienophiles to thermoplastic high polymers having elastomeric properties. The polyalkyleneether-aryleneether glycols and the corresponding thioether glycols described earlier in which anthracene radicals are present as arylene units in the polymer (i.e., $HO—B^*—OH$) may be capped in the usual way with a diene such as 2-anthracene-isocyanate and the resulting polymer extended and cross-linked to a polyether-based polyurethane on reaction, e.g., in a rubber mold in a rubber press at 140° C. for 1 hour, with a bis-dienophile such as m-phenylene-dimaleimide.

In the preferred embodiment of this invention, the polyether glycols (HO—B—OH and HO—B*—OH) are employed as their bis-chloroformates which will be capped or extended to higher molecular weight polymers on reaction with amines. Capping is accomplished in the usual way, using two moles of D—Y, e.g., 2-aminoanthracene. Preferably, the bis-chloroformate is reacted with organic diamines which may be dienic diamine or preferably mixtures of dienic diamine (Y—D—Y) with non-dienic diamine (Y—R—Y), the amino groups being either primary or secondary. The non-dienic diamines which may be used here are primary and secondary aliphatic, cycloaliphatic, aromatic or heterocyclic amines. Typical diamines are the diaminotoluenes, diaminobenzenes, ethylenediamine, tetramethylenediamine, hexamethylenediamine, decamethylenediamine, 1,4-diaminocyclohexane, 4,4'-methylene-bis(aniline), 4,4'-methylene-bis(N-methylaniline), piperazine, N,N'-diethylbenzidine, N,N'-di(beta-hydroxylethyl) p-phenylenediamine, N,N'-di(beta-hydroxyethyl) ethylenediamine, N,N'-dimethyl ethylenediamine, and 2,6-diaminopyridine.

In addition to the dienic diamines disclosed earlier, there may be employed diamines such as 2-(2,4-hexadienyl)1,3 - propylenediamine, 2 - (4,6-decadienyl)1,3-propylenediamine, N-(2,4 - hexadienyl)ethylenediamine, and N,N'-di(2,4-hexadienyl)ethylenediamine. The general procedure is to mix substantially equimolar quantities of diamine and bis-chloroformate in suitable mixing equipment in the presence of an acid acceptor which may conveniently be an inorganic carbonate for use in a mixed water and water-immiscible solvent system. With polyether bis-chloroformates of molecular weight 1000–1200 (which are preferred) it is preferred to employ mixtures of diamines having a non-dienic/dienic mole ratio of from 3 to 9/1. One preferred diamine mixture is methylene bis-N-methylaniline and 2,6-diaminoanthracene.

The bis-chloroformates may be non-dienic or dienic. For example, the preferred polytetramethyleneether bis-chloroformate may be employed in combination with a dienic bis-chloroformate such as 9,10-bis $$(—CH_2—O—(CH_2)_4—O—COCl)\text{-anthracene}$$

Mixtures of non-dienic and dienic bis-chloroformates may be reacted with non-dienic diamines or with a mixture of non-dienic and dienic diamines, the mole ratio of non-dienic to dienic components being varied as desired to introduce the desired ratio of dienic groups to polymer segment molecular weight. The polymeric bis-chloroformates may also be employed admixed with non-polymeric bis-chloroformates, such as tetramethylene bis-chloroformates, or with other polymeric bis-chloroformates, such as the polyhydrocarbon bis-chloroformates, to produce mixed polymer chains in the extension step with organic diamines.

In a variation of the above methods bis-chloroformate is employed in combination with a bis-carbamyl chloride of a dienic diamine such as the bis-carbonyl chloride of 9,10-bis(methylaminomethyl)-anthracene, and the mixture is then extended with organic diamine to produce a diene-modified polymer containing elastomeric polymer segments containing urethane and urea groups which link the polymer segments to one another as well as to the bivalent radicals containing a 1,3-diene unit.

In another variation, an elastomer is prepared having pendant functional groups capable of reacting with D—Y or Y—D—Y. As more particularly described in the examples, a bis-chloroformate such as a polytetramethyleneether bis-chloroformate is reacted in equimolar quantities with an organic diamine having pendant hydroxyalkyl groups, e.g., N,N'-di(beta-hydroxyethyl)ethylenediamine. The relative reactivities of alcoholic and amino groups are such that the chloroformate groups react substantially exclusively with the amino groups of the above diamine, the resulting extended polymer being a polyurethane-based elastomer containing pendant hydroxyalkyl groups attached to urethane nitrogens. Reaction of this polymer with a dienic acid chloride, e.g., sorboyl chloride in the presence of a tertiary amine catalyst, yields a diene-modified polyurethane elastomer in which the 1,3-diene-containing radicals (D) are linked to the polymer chain (B) through ester groups (—CO—O—CH$_2$—CH$_2$—)

and which is now convertible to a further extended and cross-linked elastomer by means of bis-dienophiles.

The starting polymer X—B—X may also be a polyurethane diamine. These novel polymers may be prepared by reacting polyether bis-chloroformates with an excess of an organic diamine. For example, by reacting two moles of polytetramethyleneether bis-chloroformate with three moles of a diamine such as 2,4-di(methylamino)toluene or methylene-bis-N-methylaniline, using calcium hydroxide as acid-acceptor, in benzene. Reaction of these polyurethane diamines with Y—D—Y, or Y—D—Y mixed with Y—R—Y, where R is a non-dienic radical and Y is —O—COCl, —COCl, or —NCO, yields polymers of the type (DLBL)$_n$—DLBL—, and (D*LBL)$_n$—D*LBL— where $n$ is an integer, L is —OCONH—, —CONH— and —NHCONH—, respectively, B is the original polyurethane segment, D is the 1,3-diene-containing group, and D* represents D and R, the relative distribution of D and R in the polymer chain depending on the mole ratio of Y—D—Y to Y—R—Y employed in the chain extension.

X—B—X may be the polyurethanes obtainable from the above polyether glycols by a variety of general procedures involving reaction of the polymeric glycols, HO—(RO)$_n$H, with organic diisocyanates at temperatures which are preferably 70–120° C. If an excess of diisocyanate is used the resulting pre-polymer contains terminal NCO groups.

The organic diisocyanates which are normally used include aromatic, aliphatic and cycloaliphatic diisocyanates and combinations of these types. Representative compounds are toluene-2,4-diisocyanate, n-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthylene diisocyanate. Arylene diisocyanates, i.e., those in which each of the two isocyanate groups is attached for the same nucleus are preferred, particularly toluene 2,4-diisocyanate.

As previously discussed, the glycols which may be used here include those in which some of the —R— groups are dienic. It should be noted that dienic-diisocyanates, e.g., anthracene-2,6-diisocyanate, preferably admixed with the more usual aliphatic, cycloaliphatic and aromatic diisocyanates, e.g., toluene-2,4-diisocyanate, may also be used in preparing the polyurethanes which will be designated as OCN—B—NCO and OCN—B*—NCO, where B is a non-dienic polyurethane segment and B* is a polyurethane segment in which some of the radicals making up the segment contain a 1,3-diene group which may come from the diisocyanate, the glycol, or both, depending upon the starting reactants employed. The molecular weight of the starting glycol will be 750–12,000 preferably in the range of 750–3000, particularly 900–1200. The molecular weight of the glycol and whether or not it contains a dienic group, and the mole ratio of non-dienic to dienic diisocyanate, will determine the frequency of appearance and the number of 1,3-diene units in the polymer. By varying the ratios of all the non-dienic to dienic components there will be obtained a variety of polyurethanes terminated by NCO groups and containing any desired number of 1,3-diene units in the pre-polymer chain.

Reaction of the isocyanate-terminated polyurethanes with two moles of D—Y, gives capped polyurethanes; reaction with an equimolar quantity of Y—D—Y yields infinitely extended polyurethanes. For reactions with the isocyanate terminated polyurethanes D—Y and Y—D—Y will be selected so that Y contains active hydrogen. The reactions of isocyanates with the active hydrogen-containing groups are tabulated below:

—NCO+HO—D—→—NH—CO—O—D—
—NCO+H$_2$N—D—→—NH—CO—NH—D—
—NCO+HS—D—→—NH—CO—S—D—
—NCO+HOOC—D—→—NH—CO—D—+CO$_2$↑
—NCO+HOSO$_2$—D—→—NH—SO$_2$—D—+CO$_2$↑

The new groups produced in these reactions which like D to the polymeric segments are designated as linking groups, L.

If substantially all of the isocyanate groups have been used up by reaction with the Y—D—Y molecules, the product will be stable. If free isocyanate groups are present they may be reacted with a non-dienic compound (R—Y) containing only one active-hydrogen of the type tabulated above or with a dienic compound containing only one active hydrogen (D—Y).

As described before for the other diene-modified polymers of this invention, the diene-modified polyurethanes are extended and cross-linked to novel polyurethane elastomers by means of bis-dienophiles as curing agents. This may be done in solution in a solvent such as dimethylformamide, or by compounding on a rubber mill, molding and press-curing.

If a diene-modified polymer of the type DLBLD is prepared, as for example by reacting a diisocyanate-polyurethane, e.g., obtained from polytetramethyleneether glycol and toluene-2,4-diisocyanate, with a dienic alcohol, e.g., sorbyl alcohol, or with a dienic amine, e.g., 2-aminoanthracene, and is then extended with a bis-dienophile, e.g., m-phenylene dimaleimide, the resulting extended but uncross-linked product is a thermoplastic elastomer. These products are generally soluble in solvents such as tetrahydrofuran and dimethylformamide. The extent and efficiency of the extension via the Diels-Alder reaction is readily determined by comparing the intrinsic viscosities of the as yet unextended diene-modified polymer with the extended polymer.

Polymers of the type DLB*LD which contain in the polymeric segment, a dienic group, e.g., arising from anthracene-2,6-diisocyanate, are extended and cross-linked at the same time on reaction with a bis-dienophile. The product, an elastomer, is no longer soluble in solvents. The polyurethane-based polymeric segment B* may be obtained by a variety of methods. For example, a polyalkyleneether-aryleneether glycol containing among its arylene units one or more anthracene-containing divalent radicals is converted into a diisocyanato-polyurethane OCN—B*—NCO on reaction with an organic diisocyanate, which may be non-dienic, dienic, or preferably a mixture of the two, e.g., toluene- and anthracene-diisocyanates. OCN—B*—NCO is then extended with an extending agent that has two active hydrogens and is either non-dienic, dienic, or a mixture, e.g., 2,4-diaminotoluene mixed with 2,6-diaminoanthracene, or hexamethylene glycol mixed with N-(octadeca-9,11 - dienoyl) - diethanolamine. The diamine extending agents are preferred, especially mixtures of non-dienic and dienic diamines in mole ratios of from 0.5/1 to 10/1. In the preparation of diene-modified polyurethanes of this invention the molecular weight of the diisocyanato-polyurethane and the mole ratios of the extending agents will be controlled to provide at least two 1,3-diene units in the polymer molecule, at least one such unit per 12,000 molecular weight of polymer segment and not more than one such curing site per every 500 molecular weight polymer segment. For the preparation of elastomers, on reaction of the diene-modified polyurethanes with bis-dienophiles, the polymers (D*LBL—$_n$D*LBL—, $n$ being an integer, are preferred. The cured products are extended and cross-linked elastic bodies.

The bis-dienophiles which may be used to prepare the extended, and the extended and cross-linked, elastomers from the diene-modified polymers, are aldehydes, ketones, sulfones, nitriles, carboxylic acids, carboxylic esters, amides and imides, and the like, that have two or potentially two unsaturated alpha-beta-carbon-carbon bonds.

Representative examples of bis-dienophiles are: the alkylene, cycloalkylene, and arylene-bismaleimides; dibenzalacetone; diacrylylbenzene

phenylene-bis(beta-acrolein)

divinylsulfone; 1,2-bis(vinylsulfonyl)ethane

low molecular weight acrylic and methacrylic esters and amides of glycols and diamines, e.g.

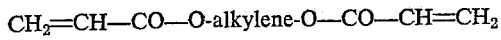

(exemplified by ethylene diacrylate)

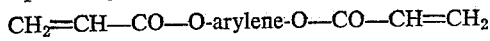

(exemplified by p-phenylene diacrylate)

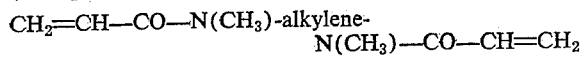

and the like (exemplified by N,N′-methylene-bisacrylamide).

The alkylene, cycloalkylene and arylene bis-maleimides are preferred. Typical bis-maleimides are ethylene-, hexamethylene-, decamethylene-cyclohexylene-, o-, m-, and p-phenylene, tolylene and naphthylene bis-maleimides, particularly m-phenylene-bis-maleimide and ethylene-bis-maleimide. The bis-maleimides are also known as the dimaleimides.

As is true for the dienophiles in general, the ease with which the bis-dienophiles undergo the Diels-Alder reaction depends upon the nature of both the dienophilic and dienic groups. In the method of this invention the bis-dienophilic extending and cross-linking agents will be selected in accordance with the nature of the 1,3-diene units in the polymer molecule. The preferred agents, the bis-maleimides may be used in all the Diels-Alder extensions and cross-linkings; that is, they are suitable for reaction with diene-modified polymers that contain either aliphatic dienic-hydrocarbon radicals, aromatic dienic-hydrocarbon radicals, or both types. The other typical bis-dienophiles described above are not as equally adaptable as the bis-maleimides. In general, at the temperatures and pressures normally employed in press-curing elastomers in commercial applications, they react more slowly than the bis-maleimides with the aromatic hydrocarbon-dienic units, and it is therefore preferred to use these materials on polymers containing the more reactive aliphatic dienic-hydrocarbon units. Since it is within the scope of this invention to have both aliphatic and aromatic dienic-hydrocarbon radicals in the polymer molecule, it will be understood that mixtures of the bismaleimides with the other bis-dienophiles may be employed.

As stated above, the Diels-Adler condensation reaction between diene-modified polymer and bis-dienophile may be effected in solution, or preferably, in a rubber press at temperatures of from 100–150° C., preferably at about 140° C., for about 0.5–2 hours, usually for one hour. The compounded stock may contain, in addition to the bis-dienophilic curing agent, conventional fillers, e.g., carbon black, antioxidant, dyes and plasticizers.

Example 1

A solution of 33 g. of diamino-polyisoprene having a number average molecular weight of 4520 (0.0073 mol) and 3.21 g. of 2-anthracene isocyanate (0.0146 mol) in 150 ml. tetrahydrofuran was stirred and heated under reflux for four hours. The mixture was filtered to remove a few milligrams of suspended solid and evaporated in vacuo at 100° C. to yield a soft, dark-brown solid having an average molecular weight of 4900 and an intrinsic viscosity of 0.145.

The above bis-anthraceneurea polyisoprene (12 g.) was compounded with the stoichiometric quantity (0.65 g.) of m-phenylenedimaleimide and cured in a mold at 140° C. for one hour. The resulting chain-extended elastomer (intrinsic viscosity=0.86) is thermoplastic and soluble in tetrahydrofuran. It has the following properties:

Tensile strength at the break (25° C.), lbs./sq. in__ 2350
Modulus at 300% elongation (25° C.), lbs./sq. in__ 1320
Elongation at the break (25° C.), percent_____ 500

Example 2

An isocyanate terminated prepolymer of average molecular weight 8250 was prepared in the usual way by reacting one mole of polytetramethyleneether glycol of average molecular weight 924 (by hydroxyl number) with 1.14 moles of 2,4-toluene-diisocyanate. 41.6 grams (0.005 mole) of this polyurethane was dissolved in 150 ml. of tetrahydrofuran which had been freshly distilled over Na-K alloy. 2.08 grams (0.01 mole) of 2-aminoanthracene was added and the mixture heated at reflux and stirred for a total of 8 hours to complete the reaction. The solvent was completely stripped in vacuo (0.01–0.05 mm. of Hg) at 100° C. using a rotating solvent stripper, to obtain a dark-brown, sticky but millable polymer having an intrinsic viscosity of 0.35.

10 grams of the above bis-2-anthraceneurea of the polyurethane was compounded with 0.34 g. of m-phenylene dimaleimide on a rubber mill at room temperature and heated at 140° C. for one hour in a mold in a rubber press. The resulting elastomeric product was soluble in dimethylformamide-tetrahydrofuran mixtures and had an intrinsic viscosity of 1.34.

Example 3

A mixture of 3 g. (0.03 mole) of sorbyl alcohol and 19.3 g. (0.005 mole) of an isocyanate-terminated polyurethane, obtained by condensing one mole of polytetramethyleneether glycol having an average molecular weight of 953 with 1.33 moles of toluene-2,4-diisocyanate, was stirred at 100° C. for 18 hours (i.e., until no free NCO groups remained). The solvent and excess sorbyl alcohol were evaporated at 0.01–0.05 mm. of Hg pressure at 100–110° C. The resulting sticky but millable bis-hexadienyl-terminated polyurethane had an intrinsic viscosity of 0.21, corresponding to a calculated average molecular weight of 4050. 11 grams was mixed with the stoichiometric quantity (0.68 g.) of m-phenylene-dimaleimide and heated and stirred at 100° C. for a few minutes to obtain a homogeneous mixture. This mixture was press-cured in a rubber mold at 140° C. for one hour to a soft, thermoplastic elastomer, soluble in tetrahydrofuran and dimethyl formamide, and having an intrinsic viscosity of 0.84. This increase in intrinsic viscosity corresponds to a 10- to 15-fold increase in molecular weight.

Substantially the same results are achieved on replacing m-phenylene-dimaleimide in the above example by an equimolar quantity of ethylenediacrylate, p-phenylene-diacrylate, N,N'-methylenebisacrylamide, or 1,2-bis(vinylsulfonyl)ethane, and heating the mixture in a mold in a rubber press at 140° C. for 1 to 3 hours.

*Example 4*

A polyurethane terminated on each end with NCO groups was prepared in the usual way from one mole polytetramethyleneether glycol having an average molecular weight 910 and 1.33 moles of toluene-2,4-diisocyanate.

A solution consisting of 0.03 mole of the polyurethane and 0.03 mole of 2,6-diaminoanthracene dissolved in a mixture of dimethylformamide (150 ml.) and tetrahydrofuran (50 ml.) was heated at 70° C. for six hours. A small quantity of piperidine was added to react with any remaining NCO groups and the mixture evaporated in vacuo at 100° C. to yield a solid polymer having a softening point above 180° C.

10 grams of this polymer along with 1 g. of m-phenylene-dimaleimide was heated at 140° C. for one hour in 50 ml. of dimethylformamide. The solvent was completely stripped in vacuo at 100° C. to give an elastomer having the following stress-strain properties in water:

|  | at 25° C. | at 70° C. |
|---|---|---|
| Modulus at 300% elongation, lbs./sq. in. | 1,300 | |
| Tensile strength at the break, lbs./sq. in. | 1,610 | 610 |
| Elongation at the break, percent | 340 | 200 |

*Example 5*

Polytetramethyleneether glycol having an average molecular weight of 954 (1 mole) was converted to a polyurethane having a calculated average molecular weight of 7860 on heating with 1.14 moles of 2,4-toluene diisocyanate.

A solution of 39.3 g. (0.005 mole) of the above isocyanate-terminated polyurethane and 0.52 g. (0.0025 mole) of 2,6-diaminoanthracene in 200 ml. tetrahydrofuran was stirred for 3 hours at reflux temperature. Then 0.183 g. (0.0015 mole) of 2,4-diaminotoluene was added and heating of the mixture at its reflux temperature was continued for another 3 hours. 0.198 gram (0.001 mole) of 2-aminoanthracene was added to react with any remaining NCO groups and the mixture again heated for three hours at reflux. The polymeric product was isolated by evaporating the mass at 0.01–0.05 mm. Hg pressure at 100° C. The polymer was soluble in dimethylformamide; intrinsic viscosity=0.66.

20 grams of the above polymer was compounded with 0.23 g. of m-phenylenedimaleimide on a rubber mill at 80–100° C. and heated in a rubber mold in a rubber press at 140° C. for one hour. The resulting cross-linked elastomer had good set and tear strength; it was insoluble in dimethylformamide but swelled about 500% in this solvent.

*Example 6*

1000 parts of polyetramethyleneether glycol having an average molecular weight 985 was added slowly to 1000 parts of liquid phosgene at 0–10° C. while stirring. Vaporized phosgene was returned to the reaction by a reflux condenser. The addition required about one hour and the mass was stirred one hour longer. The mass was then allowed to warm to 25–30° C. while phosgene boiled off. Finally nitrogen was blown through the mass until the exit gas showed an absence of phosgene.

44.4 parts of the polytetramethyleneether bis-chloroformate (having an average molecular weight of 1110) was dissolved in 134 parts of benzene. To this was added simultaneously 6.78 parts of methylene-bis(n-methylaniline), 3.26 parts of 9,10-bis(beta-hydroxyethylamino-methyl)anthracene and a solution of 9 parts of sodium carbonate in 150 parts of water. The mixture was stirred vigorously for 20 minutes. 0.5 part of phenyl-beta-naphthylamine was added and the mass was poured into 1000 parts of water. The mass was boiled 20 minutes, the water changed and boiled for 20 minutes longer. The polymer was collected and washed on a rubber wash mill with water at 40–50° C. for 10 minutes. It was transferred to a rubber mill and dried by milling at 110–120° C. for 10 minutes.

100 parts of the polymer, 40 parts of conductive channel black and 1.5 parts of m-phenylene-bis-maleimide were compounded on a rubber mill at 50–60° C. for 10 minutes. The compounded stock was heated in molds in a rubber press for one hour at 140° C. The resulting elastomer had the following properties:

Tensile strength at the break (25° C.), lbs./sq. in. _ 5000
Modulus at 300% elongation (25° C.), lbs./sq. in. _ 800
Elongation at the break (25° C.), percent _____ 630

*Example 7*

A mixture of 394 parts (0.4 mole) of polytetramethyleneether glycol having an average molecular weight of 984 and 27.6 parts (0.1 mole) of 9,10-bis(chloromethyl) anthracene was heated to 100° C. The mixture was stirred in a dry nitrogen atmosphere at this temperature and 20 parts of potassium hydroxide was added in small portions over a 4-hour period. Stirring was continued for 40 hours at 100° C. The mass was then washed with boiling water. Sufficient dilute hydrochloric acid was added to break the resulting emulsion and the material was then washed twice with hot water. The polymer was dried and treated successively with solid calcium hydroxide and activated carbon (Darco RB). The material was then filtered to give a product having a hydroxyl number of 89.5 which corresponds to an average molecular weight=1250.

400 parts of this material was treated with 400 parts of liquid phosgene as described in Example 6 to yield the bis-chloroformate.

To 55 parts of this bis-chloroformate were added simultaneously a solution of 9.04 parts of methylene-bis (N-methylaniline) in 175 parts of benzene and a solution of 9 parts sodium carbonate in 200 parts of water. The mixture was stirred vigorously for 20 minutes. 0.6 part of phenyl-beta-naphthylamine was added and the mass poured into 1000 parts of water. The mass was boiled 20 minutes, the water changed and boiled for 20 minutes longer. The polymer was collected and washed on a rubber wash mill with water at 40–50° C. for 10 minutes. It was transferred to a rubber mill and dried by milling at 110–120° C. for 10 minutes.

100 parts of the polymer, 35 parts of conductive channel black and 2 parts of m-phenylene-bis-maleimide were compounded on a rubber mill at 50–60° C. for 10 minutes. The compounded stock was heated in molds in a press for one hour at 150° C. The resulting elastomer had the following properties:

Tensile strength at the break (25° C.), lbs./sq. in. __ 2300
Modulus at 300% elongation (25° C.), lbs./sq. in. _ 480
Elongation at the break (25° C.), percent _____ 720

*Example 8*

250 parts of polytetramethyleneether glycol, having an average molecular weight of 1070, was added slowly to 100 parts of liquid phosgene at 0–10° C. while stirring. Vaporized phosgene was returned to the reaction by a reflux condenser. The addition required about one hour and the mixture was then stirred for an additional hour. The mass was allowed to warm up to 25–30° C. and the phosgene permitted to boil off. Finally, nitrogen was blown through the mass until the exit gas showed an absence of phosgene.

25 parts of the polytetramethyleneether bis-chloroformate thus obtained was dissolved in 67 parts of benzene.

This solution was vigorously agitated, and gradually and simultaneously there was added (1) a solution of 1.63 parts N,N'-di(beta-hydroxyethyl)ethylene diamine and 4.5 parts of sodium carbonate in 75 parts of water and (2) 2.26 parts methylene-bis-(N-methylaniline) in 17 parts benzene. The mixture was then stirred an additional 10 minutes, the temperature remaining at room temperature. Then 0.25 part phenyl-beta-naphthylamine was added as an antioxidant. The emulsion was poured into 500 parts of water with stirring and the mixture boiled for 20 minutes. The water layer was removed, another 500-part portion of water was added and boiled for 20 minutes. The operation was then repeated. The polymer was collected and washed on a rubber wash roll mill for 15 minutes with 40–50° C. water. The polymer was dried by milling on a smooth rubber roll mill at 110–120° C. for 10 minutes.

25 parts of the above polymer was dissolved in 360 parts of benzene. To this was added 2.05 parts of triethylamine and then a solution of 2.6 parts of sorboyl chloride in 10 parts of benzene. The mixture was stirred at room temperature overnight and then was refluxed for 1 hour. The mass was poured into 1000 parts of water and boiled 30 minutes. The polymer was collected and washed on a rubber wash mill with water at 40–50° C. for 10 minutes. It was transferred to a rubber mill and dried by milling at 110–120° C. for 10 minutes.

100 parts of the polymer, 30 parts of conductive channel black and 1.54 parts of ethylene-bis-maleimide are compounded on a rubber mill at 50–60° C. for 10 minutes. The compounded stock was heated in molds in a press for 1 hour at 140° C. The resulting elastomer had the following properties:

Tensile strength at the break (25° C.), lbs./sq. in. ---- 1650
Modulus at 300% elongation (25° C.), lbs./sq. in. ---- 1050
Elongation at the break (25° C.), percent ---- 370

In this example, the 1,2-ethylene bismaleimide may be replaced by m-phenylenebismaleimide to achieve substantially identical results. Likewise the bismaleimides may be replaced by an equimolar quantity of dibenzalacetone, 1,3-diacrylybenzene, 1,2-ethylenediacrylate, N,N'-methylene bisacrylamide, divinylsulfone, p-phenylenediacrylate, or 1,3-phenylene-bis-(beta-acrolein), and the compounded stock "press-cured" as above for 1 to 4 hours at 100–140° C. to obtain cross-linked elastomers having stress-strain properties comparable to those given above.

Example 9

22.4 parts of the polytetramethyleneether bis-chloroformate of Example 6 was dissolved in 150 parts of methylene chloride. To this was added simultaneously 3.62 parts (0.016 mole) of methylene-bis-(N-methylaniline), 0.83 part (0.004 mole) of 2,6-diaminoanthracene and a solution of 4.5 parts of sodium carbonate in 100 parts of water. The mixture was stirred vigorously for 10 minutes. 0.2 part of phenyl-beta-naphthylamine was added and the mass was poured into 500 parts of water. The mass boiled 20 minutes, the water changed and boiled 20 minutes longer. The polymer was collected and washed on a rubber wash mill with water at 40–50° C. for 10 minutes. It was transferred to a rubber mill and dried by milling at 110–120° C. for 10 minutes.

100 parts of the polymer, 30 parts of high abrasion furnace black and 2.08 parts of m-phenylene-bis-maleimide were compounded on a rubber mill at 50–60° C. for 10 minutes. The compounded stock was heated in molds in a press for one hour at 140° C. The resulting tough, resilient elastomer had the following properties:

Tensile strength at the break (25° C.), lbs./sq. in. ---- 3160
Modulus at 300% elongation (25° C.), lbs./sq. in. ---- 1860
Elongation at the break (25° C.), percent ---- 440
Compression Set (Method B, 22 hours at 70° C.), percent ---- 11

Example 10

55.2 parts of polytetramethyleneether bis-chloroformate of Example 6 was dissolved in 300 parts of methylene chloride. To the solution was added simultaneously 9.72 parts of methylene-bis(N-methylaniline), 1.28 parts 2,6-diaminoanthracene and a solution of 11.5 parts sodium carbonate in 200 parts of water. The mixture was stirred vigorously for 20 minutes. 0.6 part of phenyl-bis-naphthylamine was added and the mass was poured into 1200 parts of water. The mass was boiled for 20 minutes, the water changed and boiled 20 minutes longer. The polymer was washed and dried as above.

100 parts of the polymer, 45 parts of conductive channel black and 1 part of m-phenylene-bis-maleimide were compounded on a rubber mill for 10 minutes at 50–60° C. The compounded stock was heated in molds in a press for 1 hour at 140° C. The resulting elastomer had the following properties:

Tensile strength at the break (25° C.), lbs./sq. in. ---- 5000
Modulus at 300% elongation (25° C.), lbs./sq. in. ---- 860
Elongation at the break (25° C.), percent ---- 630

Example 11

45 parts of 1,4-butanediol was added slowly to 700 parts of liquid phosgene at 0–10° C. while stirring. Vaporized phosgene was returned to the reaction by a reflux condenser. The addition required 2 hours and the mixture was stirred an additional 6 hours. The mass was then allowed to warm up to 25–30° C. and the phosgene permitted to boil off. Nitrogen was then blown through the mass until the exit gas showed an absence of phosgene.

1.44 parts of 1,4-butane-bis-chloroformate thus obtained was mixed with 22.4 parts of the polytetramethyleneether bis-chloroformate of Example 6. To the mixture was added simultaneously 0.71 part of 2,6-diaminoanthracene, a solution of 5.26 parts of methylene-bis(N-methylaniline) in 125 parts of methylene chloride and a solution of 6 parts sodium carbonate in 100 parts of water. The mixture was stirred vigorously for 20 minutes. 0.3 part of phenyl-beta-naphthylamine was added and the mass was poured into 600 parts of water. The mass was boiled and the polymer washed and dried as above.

100 parts of polymer, 45 parts of conductive channel black and 1.55 parts of m-phenylene-bis-maleimide were compounded on a rubber mill for 10 minutes at 50–60° C. The compounded stock was heated in molds in a press for 1 hour at 140° C. The resulting elastomer had the following properties:

Tensile strength at the break (25° C.), lbs./sq. in. ---- >5100
Modulus at 300% elongation (25° C.), lbs./sq. in. ---- 1300
Elongation at the break (25° C.), percent ---- 530

The elastomers prepared according to this invention have many varied uses. They may be employed in the preparation of tires, inner tubes, belts, hose and tubing, wire and cable jackets, footwear, coated fabrics and a wide variety of coated or molded articles.

The elastomeric properties of these materials may be varied by suitable compounding. The amount and type of compounding agent to be incorporated into the stock is dependent upon the use for which the elastomer is intended. The compounding agents ordinarily used in the rubber industry with either natural or synthetic rubber are useful with the products of this invention. These include carbon black, silica, talc, titanium dioxide, and plasticizers. Inorganic and organic coloring agents may be incorporated to give well-defined colors as the natural color of these elastomers is pale yellow or light amber.

The compounding agents may be incorporated with the elastomer at the time the bis-dienophile extending and cross-linking agent is added. Conventional rubber processing machinery such as rubber mills or Werner-Pfleiderer or Banbury mixers may be used. The resulting compounded stocks may be shaped and converted to the finished elastomeric product in conventional equipment used in the rubber industry.

The linearly extended (essentially uncross-linked) products of this invention (prepared from diene-modified polymers having only two 1,3-diene units) may be dissolved in or extended with solvents (e.g., dimethylformamide or tetrahydrofuran or mixtures of these) to permit their application as coatings. Smooth films can be formed by evaporating the solvent; thus, the uncross-linked elastomers of this invention may be used for forming supported or unsupported films for coating fabrics and solid surfaces, and for forming adhesive bonds between a wide variety of substances. The linearly extended uncross-linked elastomeric products are thermoplastic, that is they soften and flow under heat and pressure but behave like conventional elastomers at normal temperatures. In being thermoplastic they are particularly useful for preparing molded elastic products such as household goods (e.g., kitchen drain mats), drug sundries, soles and heels—in short, materials which are not subjected to excessive temperatures in normal use. With the thermoplastic elastomers there is no danger of premature setting during the molding operation; scrap formed can be re-used; they may be re-molded into other shapes when desired.

The diene-modified polymers of this invention which contain more than two diene units in the molecule, as defined and illustrated in the above examples, are cross-linked, or extended and simultaneously cross-linked, on re-action with bis-dienophiles. Compounded stocks of such a diene-modified polymer and bis-dienophile may be used for the preparation of the elastomeric products having dimensional stability under heat and pressure, as required, for example, in the manufacture of tires.

I claim:

1. Essentially linear diene-modified organic polymers having a molecular weight of at least 1000 and which polymers are convertible to high molecular weight elastomers by the Diels-Alder reaction with a bis-dienophile taken from the group consisting of alkylenebismaleimides, cycloalkylenebismaleimides, arylenebismaleimides, dibenzalacetone, diacrylylbenzene, phenylene-bis(beta-acrolein), divinylsulfone, 1,2-bis(vinylsulfonyl)ethane, low molecular weight alkylene and arylene esters of acrylic acid, low molecular weight alkylene and arylene esters of methacrylic acid, low molecular weight amides of acrylic acid with diamines and low molecular weight amides of methacrylic acid with diamines, said polymers consisting of (1) at least one linear polymeric unit formed by removing the terminal functional groups, X, from a polymer having the formula XBX, in which polymer X is taken from the group consisting of amino, isocyanato, hydroxy, carboxy, chlorocarbonyl, and, chlorocarbonyloxy groups, and in which polymer B is a linear polymeric unit having a molecular weight of about 700 to about 12,000, said B unit being selected from the group consisting of hydrocarbon radicals, chlorohydrocarbon radicals, polyether radicals resulting from removing the terminal hydroxy groups from a linear polyether glycol, said polyether glycol being taken from the group consisting of polyalkyleneether glycols, polyalkyleneether-thioether glycols, polyalkyleneether-aryleneether glycols, and, polyalkyleneether-arylene-ether-thioether glycols; (2) a plurality of radicals taken from the group consisting of monovalent and divalent radicals, said radicals being formed by removing the functional groups, Y, from a non-polymeric compound of the formula $D(Y)_n$ wherein $n$ is an integer 1 to 2, Y is selected from the group consisting of amino, isocyanato, hydroxy, carboxy, chlorocarbonyloxy, chlorocarbonyl, chloro-, mercapto-, sulfo-, and chlorosulfonyl radicals, and D is selected from the group consisting of D′ and D″, D′ being selected from the group consisting of hydrocarbon radicals containing an anthracene nucleus, a conjugated diene system in an acyclic aliphatic nucleus, a conjugated diene system in a cycloaliphatic nucleus and a conjugated diene system in a mixed acyclic aliphatic-cycloaliphatic nucleus; D″ is a hydrocarbon group other than D′, said hydrocarbon group being free of aliphatic and cycloaliphatic conjugated double bonds, there being at least two D′ groups in the final polymer and at least an average of one of D′ per 12,000 molecular weight of the polymer and not more than an average of one of D′ per 500 molecular weight of polymer, with the proviso that the number of D″ groups in the radical may be zero; and (3) a plurality of linking radicals, L, connecting said B, D′, and, if present, D″, which radicals are formed by the reaction of X and Y and which radicals are selected from the group consisting of urethane, thiol-urethane, urea, carboxamide, sulfonamide, amino and ether groups, with the proviso that when $n$ of said $D(Y)_n$ is 1, D forms the terminal groups of the polymer, and that when $n$ of said $D(Y)_n$ is 2, the terminal groups of the polymer are selected from the group consisting of X and Y.

2. A diene-modified organic polymer according to claim 1 wherein L is a urethane group and B is a polyether radical resulting from removing the terminal hydroxy groups from a polytetramethylene ether glycol having a molecular weight from 750 to 12,000.

3. A diene-modified organic polyurethane according to claim 2 wherein said polymer contains in the molecule at least two 1,3-dienic anthracene containing radicals.

4. A high molecular weight elastomer prepared by reacting a diene-modified organic polymer having a molecular weight of at least 1000 with a bis-dienophile taken from the group consisting of alkylenebismaleimides, cycloalkylenebismaleimides, arylenebismaleimides, dibenzalacetone, diacrylylbenzene, phenylene-bis(beta-acrolein), divinylsulfone, 1,2-bis(vinylsulfonyl)ethane, low molecular weight alkylene and arylene esters of acrylic acid, low molecular weight alkylene and arylene esters of methacrylic acid, low molecular weight amides of acrylic acid with diamines and low molecular weight amides of methacrylic acid with diamines, said polymer consisting of (1) at least one linear polymeric unit formed by removing the terminal functional groups, X, from a polymer having the formula XBX, in which polymer X is taken from the group consisting of amino, isocyanato, hydroxy, carboxy, chlorocarbonyl, and, chlorocarobonyloxy groups, and in which polymer B is a linear polymeric unit having a molecular weight of about 700 to about 12,000, said B unit being selected from the group consisting of hydrocarbon radicals, chlorohydrocarbon radicals, polyether radicals resulting from removing the terminal hydroxy groups from a linear polyether glycol, said polyether glycol being taken from the group consisting of polyalkyleneether glycols, polyalkyleneether-thioether glycols, polyalkyleneether-aryleneether glycols, and, polyalkyleneether-arylene-ether-thioether glycols; (2) a plurality of radicals taken from the group consisting of monovalent and divalent radicals, said radicals being formed by removing the functional groups, Y, from a non-polymeric compound of the formula $D(Y)_n$ wherein $n$ is an integer 1 to 2, Y is selected from the group consisting of amino, isocyanato, hydroxy, carboxy, chlorocarbonyloxy, chlorocarbonyl, chloro-, mercapto-, sulfo-, and chlorosulfonyl radicals, and D is selected from the group consisting of D′ and D″, D′ being selected from the group consisting of hydrocarbon radicals containing an anthracene nucleus, a conjugated diene system in an acyclic aliphatic nucleus, a conjugated diene system in a cycloaliphatic nucleus and a conjugated diene system in a mixed acyclic aliphatic-cycloaliphatic nucleus; D″ is a hydrocarbon group other than D′, said hydrocarbon group being free of aliphatic and cycloaliphatic conjugated double bonds, there being at least two D′ groups in the final polymer and at least an average of one of D′ per 12,000 molecular weight of the polymer and not more than an average of one of D′ per 500 molecular weight of polymer, with the proviso that the number of D″ groups in the radical may be zero; and (3) a plurality of linking radicals, L, connecting said B, D′, and, if present, D″, which radicals are formed by the reaction of X and Y and which radicals are selected from the group consisting of urethane, thiol-urethane, urea, carboxamide, sulfonamide, amino, and ether groups, with the proviso that when $n$ of said $D(Y)_n$ is 1, D forms the terminal groups of the polymer, and that when $n$ of said $D(Y)_n$ is 2, the terminal groups of the polymer are selected from the group consisting of X and Y.

5. A high molecular weight elastomer according to claim 4 wherein a diene-modified organic polymer having a molecular weight of at least 1000 is reacted with a bis-maleimide.

6. A high molecular weight elastomer according to claim 4 wherein a diene-modified organic polymer having a molecular weight of at least 1000 is reacted with m-phenylene bis-maleimide.

7. A high molecular weight elastomer according to claim 4 wherein the diene-modified organic polymer is a diene-modified polyurethane having a molecular weight of at least 1000, and, the bis-dienophile reacted therewith is a bis-maleimide.

8. A high molecular weight elastomer according to claim 7 wherein 1,2-ethylene bis-maleimide is reacted with said diene-modified polyurethane.

9. A high molecular weight elastomer according to claim 7 wherein m-phenylene bis-maleimide is reacted with said diene-modified polyurethane.

References Cited in the file of this patent

UNITED STATES PATENTS

| | | |
|---|---|---|
| 2,280,242 | Kropa | Apr. 21, 1942 |
| 2,401,966 | Salathiel | June 11, 1946 |
| 2,518,519 | Bloch | Aug. 15, 1950 |
| 2,653,141 | Greenlee | Sept. 22, 1953 |
| 2,745,841 | Tawney et al. | May 15, 1956 |
| 2,877,212 | Seligmann | Mar. 10, 1959 |
| 2,906,738 | Goldberg | Sept. 29, 1959 |

FOREIGN PATENTS

| | | |
|---|---|---|
| 1,074,451 | France | Mar. 31, 1954 |
| 733,624 | Great Britain | July 13, 1955 |

OTHER REFERENCES

Alder: "New Methods of Preparative Organic Chemistry," Interscience Publishers, New York (1948), pp. 485–490.